United States Patent
Chakraborty et al.

(10) Patent No.: US 10,066,441 B2
(45) Date of Patent: *Sep. 4, 2018

(54) METHODS OF FABRICATING POLYCRYSTALLINE DIAMOND, AND CUTTING ELEMENTS AND EARTH-BORING TOOLS COMPRISING POLYCRYSTALLINE DIAMOND

(71) Applicant: Baker Hughes Incorporated, Houston, TX (US)

(72) Inventors: Soma Chakraborty, Houston, TX (US); Anthony A. DiGiovanni, Houston, TX (US); Gaurav Agrawal, Aurora, CO (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,888

(22) Filed: Nov. 3, 2016

(65) Prior Publication Data

US 2017/0058614 A1 Mar. 2, 2017

Related U.S. Application Data

(60) Continuation of application No. 14/885,161, filed on Oct. 16, 2015, now Pat. No. 9,499,883, which is a
(Continued)

(51) Int. Cl.
*E21B 10/567* (2006.01)
*C04B 35/626* (2006.01)
(Continued)

(52) U.S. Cl.
CPC .......... *E21B 10/567* (2013.01); *B22F 1/0062* (2013.01); *B24D 3/06* (2013.01);
(Continued)

(58) Field of Classification Search
CPC ....... E21B 10/567; E21B 10/56; C01B 32/28; C04B 35/528; C04B 35/6261;
(Continued)

(56) References Cited

U.S. PATENT DOCUMENTS

| 3,663,475 A | 5/1972 | Figiel |
| 3,709,826 A | 1/1973 | Pitt et al. |

(Continued)

FOREIGN PATENT DOCUMENTS

| CN | 1279729 | 1/2001 |
| CN | 1643183 A | 7/2005 |

(Continued)

OTHER PUBLICATIONS

Butler et al.; Controlled Synthesis of High Quality Micro/Nanodiamonds by Microwave Plasma Chemical Vapor Deposition; Diamond & Related Materials; 18, pp. 51-55; published online Sep. 30, 2008.
(Continued)

*Primary Examiner* — Pegah Parvini
(74) *Attorney, Agent, or Firm* — TraskBritt

(57) ABSTRACT

Methods of fabricating polycrystalline diamond include subjecting a particle mixture to high pressure and high temperature (HPHT) conditions to form inter-granular diamond-to-diamond bonds. Before being subjected to HPHT conditions, the particle mixture includes a plurality of non-diamond nanoparticles, diamond nanoparticles, and diamond grit. The non-diamond nanoparticles includes carbon-free cores and at least one functional group attached to the cores. Cutting elements for use in an earth-boring tool include a polycrystalline diamond material formed by such processes. Earth-boring tools include such cutting elements.

20 Claims, 6 Drawing Sheets

Related U.S. Application Data continuation-in-part of application No. 14/607,227, filed on Jan. 28, 2015, now Pat. No. 9,283,657, which is a continuation of application No. 13/619,561, filed on Sep. 14, 2012, now Pat. No. 9,309,582, which is a division of application No. 13/084,003, filed on Apr. 11, 2011, now Pat. No. 8,974,562, which is a continuation-in-part of application No. 13/077,426, filed on Mar. 31, 2011, now Pat. No. 9,776,151.

(60) Provisional application No. 61/535,475, filed on Sep. 16, 2011, provisional application No. 61/324,142, filed on Apr. 14, 2010.

(51) Int. Cl.
| | |
|---|---|
| C04B 35/632 | (2006.01) |
| C04B 35/645 | (2006.01) |
| B22F 1/00 | (2006.01) |
| C22C 1/05 | (2006.01) |
| C22C 26/00 | (2006.01) |
| B24D 3/06 | (2006.01) |
| B24D 3/34 | (2006.01) |
| B24D 18/00 | (2006.01) |
| E21B 10/56 | (2006.01) |
| C04B 35/528 | (2006.01) |
| C04B 35/628 | (2006.01) |
| C04B 37/00 | (2006.01) |
| C01B 32/28 | (2017.01) |
| E21B 10/55 | (2006.01) |

(52) U.S. Cl.
CPC ......... *B24D 3/34* (2013.01); *B24D 18/0009* (2013.01); *C01B 32/28* (2017.08); *C04B 35/528* (2013.01); *C04B 35/6261* (2013.01); *C04B 35/62655* (2013.01); *C04B 35/62802* (2013.01); *C04B 35/632* (2013.01); *C04B 35/645* (2013.01); *C04B 37/001* (2013.01); *C22C 1/051* (2013.01); *C22C 26/00* (2013.01); *E21B 10/56* (2013.01); *C04B 2235/3206* (2013.01); *C04B 2235/3217* (2013.01); *C04B 2235/3852* (2013.01); *C04B 2235/427* (2013.01); *C04B 2235/5427* (2013.01); *C04B 2235/5436* (2013.01); *C04B 2235/5445* (2013.01); *C04B 2235/5472* (2013.01); *C04B 2237/363* (2013.01); *C04B 2237/401* (2013.01); *E21B 10/55* (2013.01)

(58) Field of Classification Search
CPC ......... C04B 35/6255; C04B 35/62802; C04B 35/632; C04B 37/001; C22C 1/051; C22C 26/00; B22F 1/0062; B24D 18/0009
See application file for complete search history.

(56) References Cited

U.S. PATENT DOCUMENTS

| | | |
|---|---|---|
| 3,745,623 A | 7/1973 | Wentorf, Jr. et al. |
| 4,148,368 A | 4/1979 | Evans |
| 4,224,380 A | 9/1980 | Bovenkerk et al. |
| 4,242,106 A | 12/1980 | Morelock |
| 4,311,490 A | 1/1982 | Bovenkerk et al. |
| 4,412,980 A | 11/1983 | Tsuji et al. |
| 4,483,836 A | 11/1984 | Adadurov |
| 4,525,179 A | 6/1985 | Gigl |
| 4,592,433 A | 6/1986 | Dennis |
| 4,604,106 A | 8/1986 | Hall et al. |
| 4,605,343 A | 8/1986 | Hibbs, Jr. et al. |
| 4,636,253 A | 1/1987 | Nakai et al. |
| 4,664,705 A | 5/1987 | Horton et al. |
| 4,694,918 A | 9/1987 | Hall |
| 4,726,718 A | 2/1988 | Meskin et al. |
| 4,784,023 A | 11/1988 | Dennis |
| 4,797,241 A | 1/1989 | Peterson et al. |
| 4,861,350 A | 8/1989 | Phaal et al. |
| 4,866,885 A | 9/1989 | Dodsworth |
| 4,903,164 A | 2/1990 | Bishop et al. |
| 4,940,180 A | 7/1990 | Martell |
| 4,944,772 A | 7/1990 | Cho |
| 4,976,324 A | 12/1990 | Tibbitts |
| 5,011,514 A | 4/1991 | Cho et al. |
| 5,027,912 A | 7/1991 | Juergens |
| 5,127,923 A | 7/1992 | Bunting et al. |
| 5,217,081 A | 6/1993 | Waldenstrom et al. |
| 5,417,953 A | 5/1995 | Cappelli |
| 5,443,337 A | 8/1995 | Katayama |
| 5,472,376 A | 12/1995 | Olmstead et al. |
| 5,533,582 A | 7/1996 | Tibbitts |
| 5,540,904 A | 7/1996 | Bovenkerk et al. |
| 5,645,617 A | 7/1997 | Frushour |
| 5,662,183 A | 9/1997 | Fang |
| 5,667,028 A | 9/1997 | Truax et al. |
| 5,685,769 A | 11/1997 | Adia et al. |
| 5,722,499 A | 3/1998 | Nguyen et al. |
| 5,807,433 A | 9/1998 | Poncelet et al. |
| 5,979,577 A | 11/1999 | Fielder |
| 5,979,578 A | 11/1999 | Packer |
| 5,980,982 A | 11/1999 | Degawa et al. |
| 6,009,963 A | 1/2000 | Chaves et al. |
| 6,045,440 A | 4/2000 | Johnson et al. |
| 6,148,937 A | 11/2000 | Mensa-Wilmot et al. |
| 6,149,695 A | 11/2000 | Adia et al. |
| 6,187,068 B1 | 2/2001 | Frushour et al. |
| 6,214,079 B1 | 4/2001 | Kear et al. |
| 6,220,375 B1 | 4/2001 | Butcher et al. |
| 6,302,405 B1 | 10/2001 | Edwards |
| 6,325,165 B1 | 12/2001 | Eyre |
| 6,344,149 B1 | 2/2002 | Oles |
| 6,350,488 B1 | 2/2002 | Lee et al. |
| 6,361,873 B1 | 3/2002 | Yong et al. |
| 6,377,387 B1 | 4/2002 | Duthaler et al. |
| 6,533,644 B1 | 3/2003 | Horie et al. |
| 6,544,599 B1 | 4/2003 | Brown et al. |
| 6,655,234 B2 | 12/2003 | Scott |
| 6,655,845 B1 | 12/2003 | Pope et al. |
| 6,719,074 B2 | 4/2004 | Tsuda et al. |
| 6,951,578 B1 | 10/2005 | Belnap et al. |
| 6,991,049 B2 | 1/2006 | Eyre et al. |
| 7,070,635 B2 | 7/2006 | Frushour |
| 7,074,247 B2 | 7/2006 | Tank et al. |
| 7,147,687 B2 | 12/2006 | Mirkin et al. |
| 7,224,039 B1 | 5/2007 | McGuire et al. |
| 7,235,296 B2 | 6/2007 | Hunt et al. |
| 7,348,298 B2 | 3/2008 | Zhang et al. |
| 7,419,941 B2 | 9/2008 | Waynick |
| 7,435,296 B1 | 10/2008 | Sung |
| 7,449,432 B2 | 11/2008 | Lockwood et al. |
| 7,493,973 B2 | 2/2009 | Keshavan et al. |
| 7,516,804 B2 | 4/2009 | Vail |
| 7,572,332 B2 | 8/2009 | Gruen |
| 7,585,342 B2 | 9/2009 | Cho |
| 7,628,234 B2 | 12/2009 | Middlemiss |
| 7,635,035 B1 | 12/2009 | Bertagnolli et al. |
| 7,647,992 B2 | 1/2010 | Fang et al. |
| 7,690,589 B2 | 4/2010 | Kerns |
| 7,972,397 B2 | 7/2011 | Vail |
| 8,080,071 B1 | 12/2011 | Vail |
| 8,083,012 B2 | 12/2011 | Voronin et al. |
| 8,118,896 B2 | 2/2012 | Can et al. |
| 8,147,790 B1 | 4/2012 | Vail et al. |
| 8,911,521 B1 | 12/2014 | Miess |
| 8,974,562 B2 | 3/2015 | Chakraborty et al. |
| 8,985,248 B2 | 3/2015 | DiGiovanni et al. |
| 9,309,582 B2 * | 4/2016 | DiGiovanni .......... E21B 10/567 |
| 9,499,883 B2 * | 11/2016 | Chakraborty ......... E21B 10/567 |
| 2003/0175498 A1 | 9/2003 | Hunt et al. |
| 2003/0191533 A1 | 10/2003 | Dixon et al. |
| 2004/0022861 A1 | 2/2004 | Williams et al. |
| 2004/0037948 A1 | 2/2004 | Tank et al. |

(56) References Cited

U.S. PATENT DOCUMENTS

| | | |
|---|---|---|
| 2004/0060243 A1 | 4/2004 | Fries et al. |
| 2004/0118762 A1 | 6/2004 | Xu et al. |
| 2004/0121070 A1 | 6/2004 | Xu et al. |
| 2005/0019114 A1 | 1/2005 | Sung |
| 2005/0139397 A1 | 1/2005 | Achilles et al. |
| 2005/0136667 A1 | 6/2005 | Sung |
| 2005/0158549 A1 | 7/2005 | Khabashesku et al. |
| 2005/0159634 A1 | 7/2005 | Dahl et al. |
| 2005/0161212 A1 | 7/2005 | Leismer et al. |
| 2006/0113546 A1 | 6/2006 | Sung |
| 2006/0166615 A1 | 7/2006 | Tank et al. |
| 2006/0266559 A1* | 11/2006 | Keshavan ............ B01J 3/062 175/428 |
| 2007/0036896 A1 | 2/2007 | Sung et al. |
| 2007/0102199 A1 | 5/2007 | Smith et al. |
| 2007/0187153 A1 | 8/2007 | Bertagnolli |
| 2007/0234646 A1* | 10/2007 | Can ..................... C03C 14/004 51/307 |
| 2007/0254560 A1 | 11/2007 | Woo et al. |
| 2008/0023230 A1 | 1/2008 | Cho |
| 2008/0023231 A1 | 1/2008 | Vail |
| 2008/0127475 A1 | 6/2008 | Griffo |
| 2008/0142267 A1 | 6/2008 | Griffin et al. |
| 2008/0168717 A1 | 7/2008 | Can et al. |
| 2008/0179109 A1 | 7/2008 | Belnap et al. |
| 2008/0206576 A1 | 8/2008 | Qian et al. |
| 2008/0209818 A1 | 9/2008 | Belnap et al. |
| 2009/0022952 A1 | 1/2009 | Keshavan |
| 2009/0022969 A1 | 1/2009 | Zhang et al. |
| 2009/0042166 A1 | 2/2009 | Craig et al. |
| 2009/0090918 A1 | 4/2009 | Hobart et al. |
| 2009/0127565 A1 | 5/2009 | Sung |
| 2009/0158670 A1 | 6/2009 | Vail |
| 2009/0178345 A1 | 7/2009 | Russell et al. |
| 2009/0218146 A1 | 9/2009 | Fang et al. |
| 2009/0218276 A1 | 9/2009 | Linford et al. |
| 2009/0218287 A1 | 9/2009 | Vail et al. |
| 2009/0221773 A1 | 9/2009 | Linford et al. |
| 2009/0257942 A1 | 10/2009 | Sung |
| 2009/0277839 A1 | 11/2009 | Linford |
| 2009/0286352 A1 | 11/2009 | Sung |
| 2009/0313908 A1 | 12/2009 | Zhang et al. |
| 2010/0012389 A1 | 1/2010 | Zhang et al. |
| 2010/0041315 A1 | 2/2010 | Sung |
| 2010/0068503 A1 | 3/2010 | Neogi et al. |
| 2010/0069567 A1 | 3/2010 | Petrov et al. |
| 2010/0129615 A1 | 5/2010 | Chizik et al. |
| 2010/0187925 A1 | 7/2010 | Tingle et al. |
| 2010/0209665 A1 | 8/2010 | Konovalov et al. |
| 2011/0031034 A1 | 2/2011 | DiGiovanni et al. |
| 2011/0042147 A1 | 2/2011 | Fang et al. |
| 2011/0059876 A1 | 3/2011 | Takahama et al. |
| 2011/0088954 A1 | 4/2011 | DiGiovanni et al. |
| 2011/0252711 A1 | 10/2011 | Chakraborty et al. |
| 2011/0252712 A1 | 10/2011 | Chakraborty et al. |
| 2011/0252713 A1 | 10/2011 | Chakraborty et al. |
| 2012/0003479 A1 | 1/2012 | Hsin et al. |
| 2012/0034464 A1* | 2/2012 | Chakraborty .......... B82Y 30/00 428/402 |
| 2012/0037431 A1 | 2/2012 | DiGiovanni et al. |
| 2013/0068540 A1 | 3/2013 | DiGiovanni |
| 2013/0068541 A1 | 3/2013 | DiGiovanni et al. |
| 2013/0149447 A1 | 6/2013 | Mazyar et al. |
| 2015/0143755 A1 | 5/2015 | Chakraborty et al. |
| 2016/0052109 A1 | 2/2016 | DiGiovanni |

FOREIGN PATENT DOCUMENTS

| | | |
|---|---|---|
| CN | 1763267 | 4/2006 |
| CN | 1954042 A | 4/2007 |
| DE | 102011050112 A1 | 11/2011 |
| EP | 604211 A1 | 6/1994 |
| EP | 659510 B1 | 6/1995 |
| EP | 343846 | 4/1996 |
| EP | 941791 A2 | 9/1999 |
| EP | 1330323 B1 | 5/2006 |
| EP | 2105256 A1 | 9/2009 |
| EP | 2147903 A2 | 1/2010 |
| EP | 2431327 A1 | 3/2012 |
| JP | 1103990 | 4/1989 |
| JP | 4317497 | 11/1992 |
| JP | 5132394 | 5/1993 |
| JP | 9201525 | 8/1997 |
| JP | 2007002278 | 1/2007 |
| JP | 2008115303 A | 5/2008 |
| JP | 2009091234 | 4/2009 |
| WO | 0038864 A1 | 7/2000 |
| WO | 0234437 A2 | 5/2002 |
| WO | 02034437 A3 | 5/2002 |
| WO | 2006032984 A2 | 3/2006 |
| WO | 2006061672 A1 | 6/2006 |
| WO | 2007041381 | 4/2007 |
| WO | 2008014003 A2 | 1/2008 |
| WO | 2008092093 A2 | 7/2008 |
| WO | 2008094190 A2 | 8/2008 |
| WO | 2008130431 A2 | 10/2008 |
| WO | 2009048268 A2 | 4/2009 |
| WO | 2009118381 A2 | 10/2009 |
| WO | 2009147629 A1 | 12/2009 |
| WO | 2010045257 A1 | 4/2010 |
| WO | 2010062419 A2 | 6/2010 |
| WO | 2011046838 A1 | 4/2011 |
| WO | 2011130023 A2 | 10/2011 |
| WO | 2011130516 A2 | 10/2011 |
| WO | 2011130517 A2 | 10/2011 |

OTHER PUBLICATIONS

Liu et al., "Functionalization of Carbon Nano-Onions by Direct Fluorinations" Chem. Mater. vol. 19, No. 4 (2007) pp. 778-786.

Moore et al., Individually Suspended Single-Walled Carbon Nanotubes in Various Surfactants, American Chemical Society, Nano Letters, vol. 3, No. 10, 2003, pp. 1379-1382.

"Hydrogen-terminated diamond surfaces and interfaces" Hiroshi Kawarada Surface Science Reports 26 (1996) 205-259. Available online Feb. 11 1999. http://dx.doi.org/1 0.1 016/S0167-5729(97)80002-7.

"Clathrate hydrates" Peter Englezos Industrial & Engineering Chemistry Research 1993 32 (7), 1251-1274. DOI: 10.1021 /ie00019a001.

Kruger; Diamond Nanoparticles: Jewels for Chemistry and Physics; Ad. Mater.; 20, 2445-2449; 2008.

Atwater et al., Accelerated growth of carbon nanofibers using physical mixtures and alloys of Pd and Co in an ethylene-hydrogen environment, Carbon 49 (2011) pp. 1058-1066.

Cappelli et al., "In-situ mass sampling during supersonic arcjet synthesis of diamond," Diamond and Related Materials, 3 (1994), pp. 417-421.

Cleveland et al., Raman Spectrum of 1-Bromo-Dodecane, Journal of Chemical Physics, (1940), vol. 8, pp. 367-868.

Chinese Office Action for Chinese Application No. 201280052009.6 dated Jun. 30, 2015, 14 pages.

Chinese Office Action for Chinese Application No. 201280052009.6 dated Mar. 4, 2016, 4 pages.

DiGiovanni et al., U.S. Appl. No. 61/535,475, entitled, Functionalized Carbon-Free Particles for Improved Sintering of Polycrystalline Diamond, filed Sep. 16, 201.

Homma et al., Single-Walled Carbon Nanotube Growth with Non-Iron-Group "Catalysts" by Chemical Vapor Deposition, Nano Res (2009) 2: pp. 793-799.

International Preliminary Report on Patentability from International Application No. PCT/US2012/055425, dated Mar. 18, 2014, 7 pages.

International Search Report from International Application No. PCT/US2012/055425, dated Feb. 28, 2013, 3 pages.

International Written Opinion from International Application No. PCT/US2012/055425, dated Feb. 28, 2013, 6 pages.

(56) References Cited

OTHER PUBLICATIONS

Koizumi et al., Physics and Applications of CVD Diamond, Wiley-VCH Verlag GmbH & Co. KGaA, 2008, ISB: 978-3-527-40801-6, 55 pages.

Mahdavian et al., Nanocomposite Particles with Core-Shell Morphology III: Preparation and Characterization of Nano Al2O3-Poly(styrene-methyl Methacrylate) Particles Via Miniemulsion Polymerization, Polym. Bull. (2009) vol. 63, pp. 329-340.

Martin, High-quality diamonds from an acetylene mechanism, Journal of Materials Science Letters 12 (1993), pp. 246-248.

Matsumoto et al., Vapor Deposition of Diamond Particles from Methane, Japanese Journal of Applied Physics, vol. 21, No. 4, Apr. 1982, pp. L183-L185.

Panchakarla et al., "Carbon nanostructures and graphite-coated metal nanostructures obtained by pyrolysis of ruthenocene and ruthenocene-ferrocene mixtures," Bull. Mater. Sci., vol. 30, No. 1, Feb. 2007, pp. 23-29.

Pohanish, Richard P., (2012). Sillig's Handbook of Toxic and Hazardous Chemicals and Carcinogens (6th Edition)—Paraffin Wax. Elsevier. Online version available at: http://app.knovel.com/hotlink/pdf/id:kt0094M12G/sittigs-handbook-toxic-3/paraffin-wax).

Rao et al., "Synthesis of multi-walled and single-walled nanotubes, aligned-nanotube bundles and nanorods by employing organometallic precursors," Mater Res Innovat (1998) 2, pp. 128-141.

Saini et al., Core-Shell Diamond as a Support for Solid-Phase Extraction and High-Performance Liquid Chromatography, Anal. Chem., (2010), vol. 82, No. 11, pp. 4448-4456.

Sen et al., Carbon nanotubes by the metallocene route, Chemical Physics Letters 267 (1997) pp. 276-280.

Yang et al., Morphology and microstructure of spring-like carbon micro-coils/nano-coils prepared by catalytic pyrolysis of acetylene using Fe-containing alloy catalysts, Carbon 43 (2005) pp. 827-834.

Yarbrough et al., "Diamond growth with locally supplied methane and acetylene," J. Mater. Res., vol. 7, No. 2, Feb. 1992, pp. 379-383.

Yu et al., Catalytic synthesis of carbon nanofibers and nanotubes by the pyrolysis of acetylene with iron nanoparticles prepared using a hydrogen-arc plasma method, Materials Letters 63 (2009) pp. 1677-1679.

Delmas M et al: "Long and aligned multi-walled carbon nanotubes grown on carbon and metallic substrates by injection-CVD process", ECS Transactions, Electrochemical Society, US, vol. 25, No. 8, Jan. 1, 2009 (Jan. 1, 2009), pp. 757-762, XP008131461, ISSN: 1938-5862, DOI: 1 0.1149/1 .3207664.

* cited by examiner

METHODS OF FABRICATING POLYCRYSTALLINE DIAMOND, AND CUTTING ELEMENTS AND EARTH-BORING TOOLS COMPRISING POLYCRYSTALLINE DIAMOND

CROSS-REFERENCE TO RELATED APPLICATIONS

This application is a continuation of U.S. patent application Ser. No. 14/885,161, filed Oct. 16, 2015, now U.S. Pat. No. 9,499,883, issued Nov. 22, 2016, which is a continuation of U.S. patent application Ser. No. 13/619,561, filed Sep. 14, 2012, now U.S. Pat. No. 9,309,582, issued Apr. 12, 2016, which application claims the benefit of U.S. Provisional Patent Application Serial No. 61/535,475, filed Sep. 16, 2011, in the name of DiGiovanni and Chakraborty, the disclosure of each of which is hereby incorporated herein in its entirety by this reference. U.S. patent application Ser. No. 14/885,161 is also a continuation-in-part of U.S. patent application Ser. No. 14/607,227, filed Jan. 28, 2015, now U.S. Pat. No. 9,283,657, issued Mar. 15, 2016, which is a divisional of U.S. patent application Ser. No. 13/084,003, filed Apr. 11, 2011, now U.S. Pat. No. 8,974,562, issued Mar. 10, 2015, which is a continuation-in-part of U.S. patent application Ser. No. 13/077,426, filed Mar. 31, 2011, now U.S. Pat. No. 9,776,151, issued Oct. 3, 2017, which claims priority to U.S. Provisional Patent Application Ser. No. 61/324,142, filed Apr. 14, 2010, the disclosure of each of which is hereby incorporated herein in its entirety by this reference.

The subject matter of this application is also related to the subject matter of U.S. patent application Ser. No. 13/619,210, filed Sep. 14, 2012, now U.S. Pat. No. 9,205,531, issued Dec. 8, 2015, the disclosure of which is hereby incorporated herein in its entirety by this reference. The subject matter of this application is also related to the subject matter of U.S. patent application Ser. No. 13/316,094, filed Dec. 9, 2011, now U.S. Pat. No. 10,005,672, issued Jun. 26, 2018, the disclosure of which is hereby incorporated herein in its entirety by this reference.

TECHNICAL FIELD

Embodiments of the present invention relate generally to methods of forming polycrystalline diamond material, cutting elements including polycrystalline diamond material, and earth-boring tools for drilling subterranean formations including such cutting elements.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits include cones that are mounted on bearing pins extending from legs of a bit body such that each cone is capable of rotating about the bearing pin on which the cone is mounted. A plurality of cutting elements may be mounted to each cone of the drill bit.

The cutting elements used in such earth-boring tools often include polycrystalline diamond cutters (often referred to as "PDCs"), which are cutting elements that include a polycrystalline diamond (PCD) material. Such polycrystalline diamond cutting elements are formed by sintering and bonding together relatively small diamond grains or crystals under conditions of high temperature and high pressure in the presence of a catalyst (such as cobalt, iron, nickel, or alloys and mixtures thereof) to form a layer of polycrystalline diamond material on a cutting element substrate. These processes are often referred to as high pressure high temperature (or "HPHT") processes. The cutting element substrate may comprise a cermet material (i.e., a ceramic-metal composite material) such as cobalt-cemented tungsten carbide. In such instances, the cobalt (or other catalyst material) in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HPHT process.

Upon formation of a diamond table using an HPHT process, catalyst material may remain in interstitial spaces between the grains or crystals of diamond in the resulting polycrystalline diamond table. The presence of the catalyst material in the diamond table may contribute to thermal damage in the diamond table when the cutting element is heated during use, due to friction at the contact point between the cutting element and the formation. Polycrystalline diamond cutting elements in which the catalyst material remains in the diamond table are generally thermally stable up to a temperature of about 750° C., although internal stress within the polycrystalline diamond table may begin to develop at temperatures exceeding about 350° C. This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about 750° C. and above, stresses within the diamond table may increase significantly due to differences in the coefficients of thermal expansion of the diamond material and the catalyst material within the diamond table itself. For example, cobalt thermally expands significantly faster than diamond, which may cause cracks to form and propagate within a diamond table including cobalt, eventually leading to deterioration of the diamond table and ineffectiveness of the cutting element.

To reduce the problems associated with different rates of thermal expansion in polycrystalline diamond cutting elements, so-called "thermally stable" polycrystalline diamond (TSD) cutting elements have been developed. Such a thermally stable polycrystalline diamond cutting element may be formed by leaching the catalyst material (e.g., cobalt) out from interstitial spaces between the diamond grains in the diamond table using, for example, an acid. All of the catalyst material may be removed from the diamond table, or only a portion may be removed. Thermally stable polycrystalline diamond cutting elements in which substantially all catalyst material has been leached from the diamond table have been reported to be thermally stable up to temperatures of about 1200° C. It has also been reported, however, that such fully leached diamond tables are relatively more brittle and vulnerable to shear, compressive, and tensile stresses than are non-leached diamond tables. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which only a portion of the catalyst material has been leached from the diamond table.

BRIEF SUMMARY

In some embodiments of the disclosure, a method of fabricating polycrystalline diamond includes functionalizing surfaces of carbon-free nanoparticles with one or more functional groups, combining the functionalized nanoparticles with diamond nanoparticles and diamond grit to form a particle mixture, and subjecting the particle mixture to high pressure and high temperature (HPHT) conditions to form inter-granular bonds between the diamond nanoparticles and the diamond grit.

In some embodiments, a cutting element for use in an earth-boring tool includes polycrystalline diamond material formed by a method comprising functionalizing surfaces of carbon-free nanoparticles with one or more functional groups, combining the functionalized nanoparticles with diamond nanoparticles and diamond grit to form a particle mixture, and subjecting the particle mixture to HPHT conditions to form inter-granular bonds between the diamond nanoparticles and the diamond grit.

In some embodiments, an earth-boring tool includes a cutting element. The cutting element includes a polycrystalline diamond material formed by a method comprising functionalizing surfaces of carbon-free nanoparticles with one or more functional groups, combining the functionalized nanoparticles with diamond nanoparticles and diamond grit to form a particle mixture, and subjecting the particle mixture to HPHT conditions to form inter-granular bonds between the diamond nanoparticles and the diamond grit.

DETAILED DESCRIPTION

Figure 1:
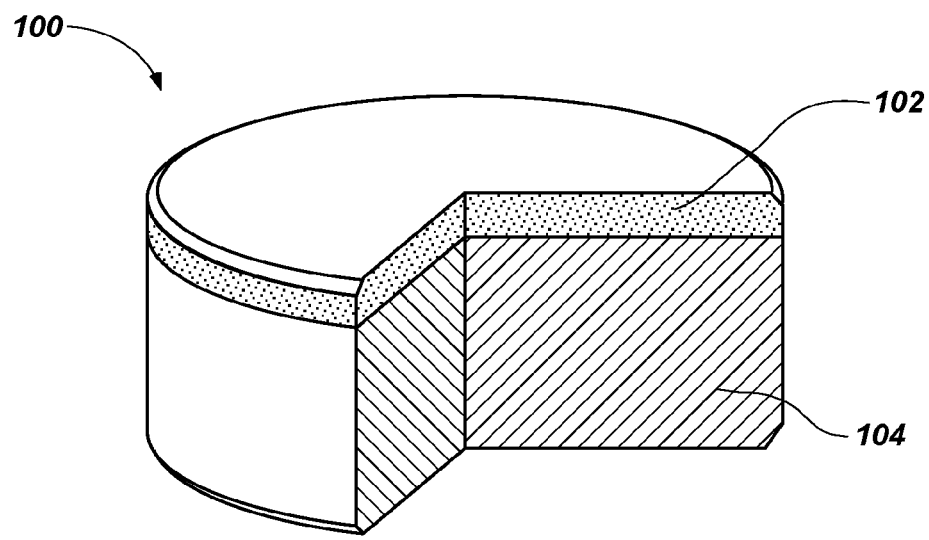
FIG. 1 is a partially cut-away perspective view of an embodiment of a cutting element including a volume of polycrystalline diamond on a substrate.

The illustrations presented herein are not meant to be actual views of any particular material, apparatus, system, or method, but are merely idealized representations which are employed to describe certain embodiments of the present invention. For clarity in description, various features and elements common among the embodiments of the invention may be referenced with the same or similar reference numerals.

FIG. 1 illustrates a cutting element 100, which may be formed in accordance with embodiments of methods as disclosed herein. The cutting element 100 includes polycrystalline diamond 102. Optionally, the cutting element 100 also may include a substrate 104, to which the polycrystalline diamond 102 may be bonded. For example, the substrate 104 may include a generally cylindrical body of cobalt-cemented tungsten carbide material, although substrates of different geometries and compositions also may be employed. The polycrystalline diamond 102 may be in the form of a table (i.e., a layer) of polycrystalline diamond 102 on the substrate 104, as shown in FIG. 1. The polycrystalline diamond 102 may be provided on (e.g., formed on or secured to) a surface of the substrate 104. In additional embodiments, the cutting element 100 may simply comprise a volume of the polycrystalline diamond 102 having any desirable shape, and may not include any substrate 104.

Figure 2:
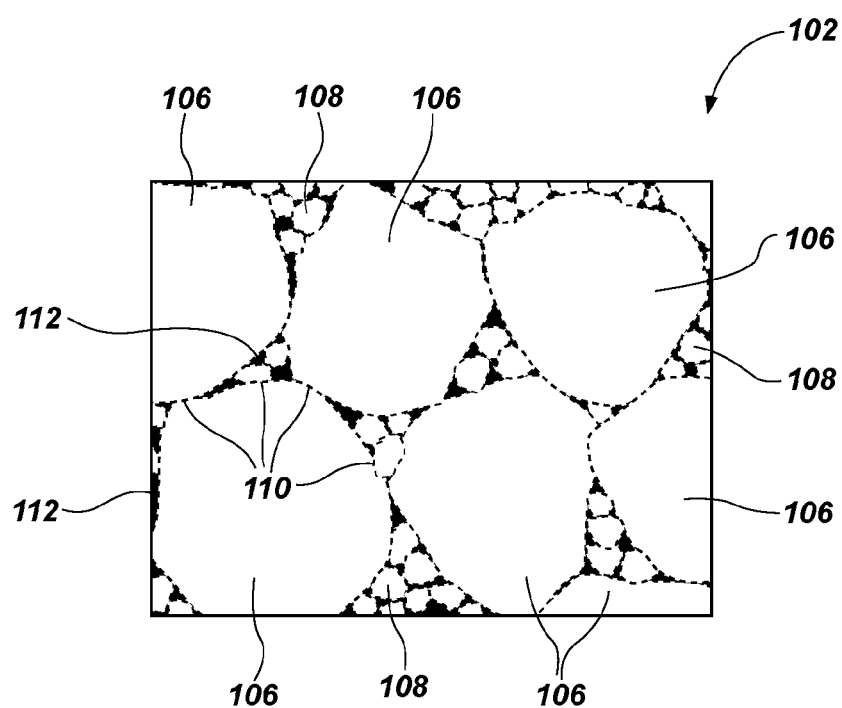
FIG. 2 is a simplified view illustrating how a microstructure of the polycrystalline diamond of the cutting element of FIG. 1 may appear under magnification.

As shown in FIG. 2, the polycrystalline diamond 102 may include interspersed and interbonded diamond grains that form a three-dimensional network of diamond material. Optionally, in some embodiments, the diamond grains of the polycrystalline diamond 102 may have a multimodal grain size distribution. For example, the polycrystalline diamond 102 may include larger diamond grains 106 and smaller diamond grains 108. The larger diamond grains 106 and/or the smaller diamond grains 108 may have average particle dimensions (e.g., mean diameters) of less than 1 mm, less than 0.1 mm, less than 0.01 mm, less than 1 µm, less than 0.1 µm, or even less than 0.01 µm. That is, the larger diamond grains 106 and smaller diamond grains 108 may each include micron diamond particles (diamond grains in a range from about 1 µm to about 500 µm (0.5 mm)), submicron diamond particles (diamond grains in a range from about 500 nm (0.5 µm) to about 1 µm), and/or diamond nanoparticles (particles having an average particle diameter of about 500 nm or less). In some embodiments, the larger diamond grains 106 may be micron diamond particles, and the smaller diamond grains 108 may be submicron diamond particles or diamond nanoparticles. In some embodiments, the larger diamond grains 106 may be submicron diamond particles, and the smaller diamond grains 108 may be diamond nanoparticles. In other embodiments, the diamond grains of the polycrystalline diamond 102 may have a monomodal grain size distribution. The direct diamond-to-diamond inter-granular bonds between the diamond grains 106, 108 are represented in FIG. 2 by dashed lines 110. Interstitial spaces 112 (shaded black in FIG. 2) are present between the interbonded diamond grains 106, 108 of the polycrystalline diamond 102. These interstitial spaces 112 may be at least partially filled with a solid substance, such as a metal solvent catalyst (e.g., iron, cobalt, nickel, or an alloy or mixture thereof) and/or a carbon-free material. In other embodiments, the interstitial spaces 112 may include empty voids within the polycrystalline diamond 102 in which there is no solid or liquid substance (although a gas, such as air, may be present in the voids). Such empty voids may be formed by removing (e.g., leaching) solid material out from the interstitial spaces 112 after forming the polycrystalline diamond 102. In yet further embodiments, the interstitial spaces 112 may be at least partially filled with a solid substance in one or more regions of the polycrystalline diamond 102, while the interstitial spaces 112 in one or more other regions of the polycrystalline diamond 102 include empty voids.

Embodiments of methods disclosed herein may be used to form the polycrystalline diamond 102, and may result in improved inter-granular diamond-to-diamond bonding between the diamond grains 106, 108 in the polycrystalline diamond 102.

Carbon-free particles (e.g., nanoparticles, submicron particles, and/or micron-sized particles) may be functionalized with diamond precursor functional groups and mixed with diamond particles (e.g., nanoparticles, submicron particles, and/or micron-sized particles) before the diamond particles are subjected to HPHT processing to form the polycrystalline diamond 102. FIGS. 3A-3D illustrate example embodiments of methods that may be used to form a particle mixture to be subjected to HPHT conditions to form polycrystalline diamond 102.

Figure 3A:
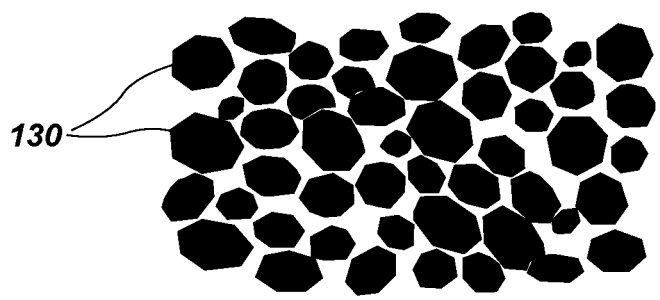
FIGS. 3A through 3D illustrate the formation of a particle mixture by combining functionalized nanoparticles with diamond nanoparticles and diamond grit for use in forming polycrystalline diamond of the cutting element of FIG. 1.

FIG. 3A shows a simplified view of diamond nanoparticles 130. The diamond nanoparticles 130 may be monomodal or multi-modal (including bimodal). In some embodiments, the diamond nanoparticles 130 may include an outer carbon shell, which may be referred to in the art as a carbon "onion." In other embodiments, the diamond nanoparticles 130 may not include any such outer carbon shell.

Figure 3B:
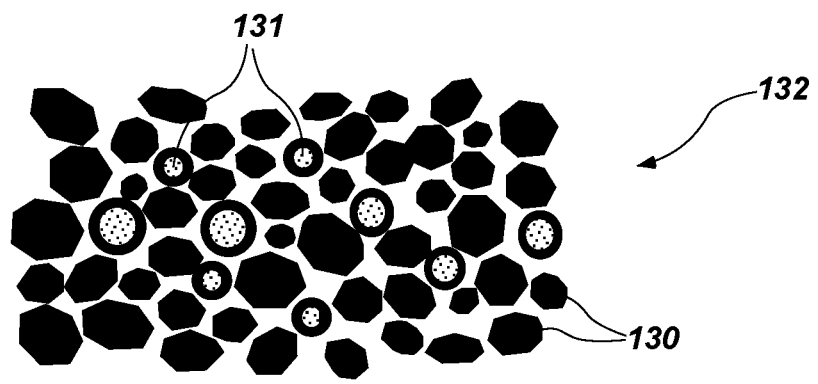

As shown in FIG. 3B, the diamond nanoparticles 130 may be combined and mixed with functionalized nanoparticles 131 having a carbon-free core to form a first particle mixture 132. The functionalized nanoparticles 131 may have a core including, for example, metal or a metal alloy. The metal or metal alloy may be, for example, iron, cobalt, nickel, or an alloy or mixture of such metals. Such metals may serve as a solvent metal catalyst for the formation of the direct diamond-to-diamond inter-granular bonds, as known in the art. In additional embodiments, the functionalized nanoparticles 131 may have a core including a ceramic material such as an oxide (e.g., alumina, ($Al_2O_3$) magnesia (MgO), etc.) or a nitride.

As non-limiting examples, the core may be functionalized with a functional group, such as a methyl functional group or an acetylene functional group. Functional groups that include carbon and hydrogen may enhance the formation of inter-granular diamond-to-diamond bonds between the diamond grains 106, 108 in the polycrystalline diamond 102 (FIG. 2). Without being bound to a particular theory, the hydrogen in the chemical functional group may provide a reducing atmosphere in the vicinity of the diamond particles at HPHT conditions. For example, at HPHT conditions, the functional groups may at least partially dissociate or decompose. Products of such decomposition may include elemental carbon and hydrogen.

In some embodiments, carbon-free cores (e.g., carbon-free nanoparticles, such as ceramic nanoparticles) may be functionalized by exposing the carbon-free cores to functional groups including carbon and hydrogen. For example, the functional group may be a methyl group, provided by exposing the carbon-free cores to a methane gas environment. The methane gas may form carbon-based functional groups on the carbon-free cores by chemical vapor deposition (CVD). In certain embodiments, nanoparticles may be treated with acid, then encapsulated with a polymer. Such a process is described in A. R. Mandavian et al., "Nanocomposite particles with core-shell morphology III: preparation and characterization of nano $Al_2O_3$—poly(styrene-methyl methacrylate) particles via miniemulsion polymerization," 63 POLYMER BULLETIN 329-340 (2009), which is incorporated herein in its entirety by this reference. In other embodiments, the carbon-free cores may be functionalized using techniques such as those disclosed in, for example, U.S. Patent Application Publication No. 2011/0252711, published Oct. 20, 2011, and entitled "Method of Preparing Polycrystalline Diamond from Derivatized Nanodiamond," the disclosure of which is incorporated herein in its entirety by this reference.

In some embodiments, functionalized nanoparticles 131 having different functional groups may be admixed before mixing the functionalized nanoparticles 131 with the diamond nanoparticles 130. For example, functionalized nanoparticles 131 having a first functional group may be admixed in any proportion with functionalized nanoparticles 131 having a second functional group. Thus, the amount of each functional group in the mixture of functionalized nanoparticles 131 and in the resulting first particle mixture 132 may be selected or tailored. The particular functional group or combination of functional groups may be selected to have a selected ratio of carbon atoms to hydrogen atoms. For example, the functional group or combination of functional groups may have a ratio of carbon atoms to hydrogen atoms from about 1:1 to about 1:3, such as from about 1:2 to about 1:3.

The first particle mixture 132, shown in FIG. 3B, may be formed, for example, by suspending the functionalized nanoparticles 131 and the diamond nanoparticles 130 in a liquid to form a suspension. The suspension may be dried, leaving behind the first particle mixture 132, which may be in the form of a powder product (e.g., a powder cake). The drying process may include, for example, one or more of a spray-drying process, a freeze-drying process, a flash-drying process, or any other drying process known in the art.

Figure 3C:
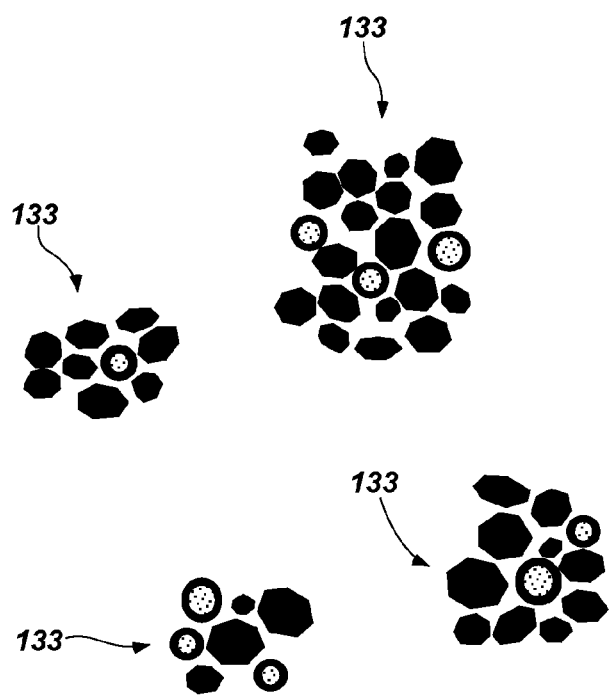
Figure 3D:
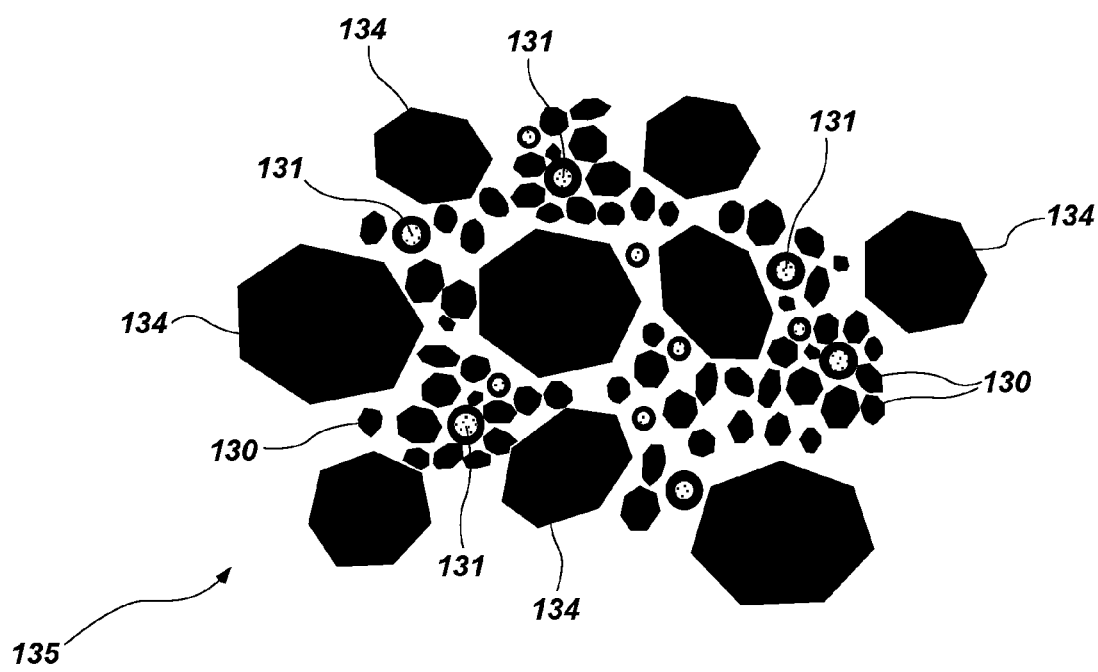

Optionally, the first particle mixture 132 may be crushed, milled, or otherwise agitated so as to form relatively small clusters or agglomerates 133 of the first particle mixture 132, as shown in FIG. 3C. The agglomerates 133 of the first particle mixture 132 may be combined and mixed with relatively larger diamond particles 134 (i.e., diamond "grit") to form a second particle mixture 135, as shown in FIG. 3D. As a non-limiting example, the relatively larger diamond particles 134 may be micron diamond particles and/or submicron diamond particles, having an average particle size of between about five hundred nanometers (500 nm) and about ten microns (10 μm). The relatively larger diamond particles 134, like the diamond nanoparticles 130, may or may not include an outer carbon shell.

In additional embodiments, the second particle mixture 135 may be formed by suspending the relatively larger diamond particles 134 in a liquid suspension together with the diamond nanoparticles 130 and the functionalized nanoparticles 131, and subsequently drying the liquid suspension using a technique such as those previously disclosed. In such methods, distinct first and second particle mixtures may not be produced, as the diamond nanoparticles 130, the functionalized nanoparticles 131, and the relatively larger diamond particles 134 may be combined together in a single liquid suspension, which may be dried to form the second particle mixture 135 directly.

The second particle mixture 135 thus includes the diamond nanoparticles 130, the functionalized nanoparticles 131, and the larger diamond particles 134. The second particle mixture 135 then may be subjected to HPHT processing to form polycrystalline diamond 102. Optionally, the second particle mixture 135 may be subjected to a milling process prior to subjecting the second particle mixture 135 to an HPHT process.

In some embodiments, the HPHT conditions may comprise a temperature of at least about 1400° C. and a pressure of at least about 5.0 GPa.

Figure 4:
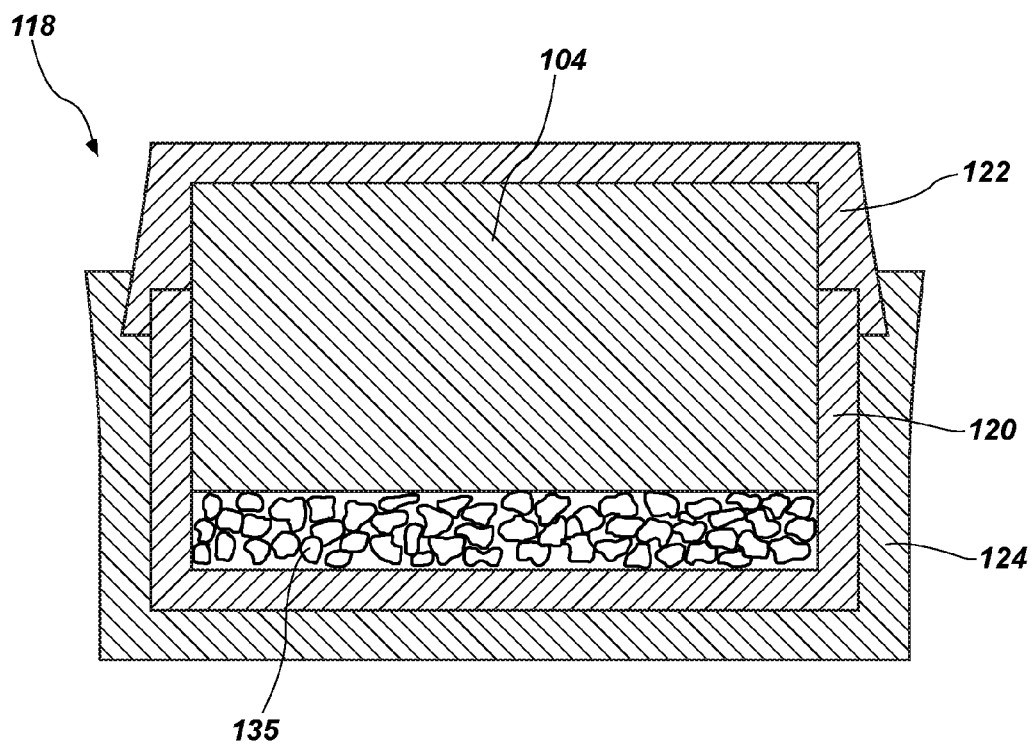
FIG. 4 is a simplified cross-sectional view illustrating materials used to form the cutting element of FIG. 1, including the particle mixture formed as described with reference to FIGS. 3A through 3D, in a container in preparation for subjecting the container to an HPHT sintering process.

Referring to FIG. 4, the particle mixture 135 may be positioned within a canister 118 (e.g., a metal canister). The particle mixture 135 includes the diamond nanoparticles 130 and the relatively larger diamond particles 134, which will ultimately form the diamond grains 108, 106, respectively, in the polycrystalline diamond 102 (FIG. 2) during sintering. The particle mixture 135 also includes the functionalized nanoparticles 131.

As shown in FIG. 4, the canister 118 may include an inner cup 120 in which the particle mixture 135 may be disposed. If the cutting element 100 is to include a substrate 104, the substrate 104 optionally may be provided in the inner cup 120 over or under the particle mixture 135, and may ultimately be encapsulated in the canister 118. The canister 118 may further include a top end piece 122 and a bottom end piece 124, which may be assembled and bonded together (e.g., swage bonded) around the inner cup 120 with the particle mixture 135 and the optional substrate 104 therein. The sealed canister 118 then may be subjected to an HPHT process to form the polycrystalline diamond 102.

In some embodiments, a hydrocarbon substance, such as methane gas, another hydrocarbon, or a mixture of hydrocarbons, also may be encapsulated in the canister 118 in the spaces between the various particles in the particle mixture 135. Methane is one of the primary carbon sources used to form films of polycrystalline diamond in CVD processes. The hydrocarbon substance, if used, may be infiltrated into the canister 118 (e.g., the inner cup 120 of the canister 118) in which the particle mixture 135 is present. The canister 118 may then be sealed with the particle mixture 135 and the hydrocarbon substance therein. The hydrocarbon substance may be introduced after performing a vacuum purification process (e.g., after exposing the particle mixture 135 and/or the canister 118 to a reduced-pressure (vacuum) environment at a selected temperature to evaporate volatile compounds) on the particle mixture 135 to reduce impurities within the canister 118. The hydrocarbon substance may also be introduced into the canister 118 under pressure, such that the concentration of the hydrocarbon substance is selectively controlled prior to sealing the canister 118 and subjecting the sealed canister 118 to HPHT conditions. In other words, by selectively controlling the pressure (e.g., partial pressure) of the hydrocarbon substance, the concentration of the hydrocarbon substance in the sealed container 118 also may be selectively controlled. In some embodiments in which the hydrocarbon substance introduced into the canister 118 under pressure, the partial pressure of the hydrocarbon substance may be at least about 10 kPa, at least about 100 kPa, at least about 1000 kPa (1.0 MPa), at least about 10 MPa, at least about 100 MPa, or even at least about 500 MPa.

The temperature of the particle mixture 135, the optional hydrocarbon substance, and the canister 118 may be selectively controlled prior to sealing the canister 118 and subjecting the sealed canister 118 to HPHT conditions. For example, a hydrocarbon substance may be introduced and the canister 118 sealed at temperatures, for example, of less than −150° C., less than −161° C., or less than −182° C. In some embodiments, the hydrocarbon substance may be introduced at temperatures of about −196° C. (77 K) or even about −269° C. (4.2 K), temperatures of liquid nitrogen and liquid helium, respectively. At such temperatures, the hydrocarbon substance may be liquid or solid, and sealing the canister 118 with the hydrocarbon substance may be relatively simpler than sealing a gaseous hydrocarbon substance in the canister 118. In particular, if the hydrocarbon substance is methane, the methane may be in liquid form at temperatures less than −161° C. and in solid form at temperatures less than −182° C., the boiling point and melting point, respectively, of methane. Appropriate temperatures at which other hydrocarbon substances are in liquid or solid form may be selected by a person having ordinary skill in the art, and are not tabulated herein.

Figure 5A:
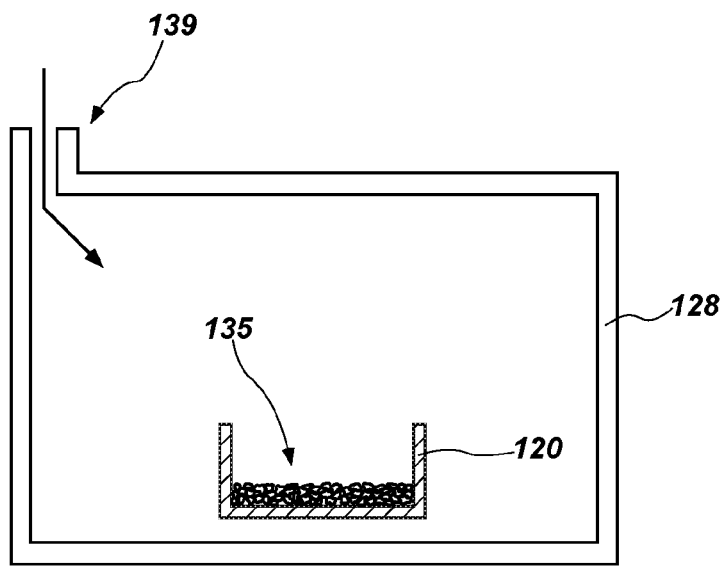
FIGS. 5A and 5B illustrate the materials of FIGS. 3A through 3D being encapsulated in the container of FIG. 4 in a gaseous environment comprising a hydrocarbon substance (e.g., methane) within an enclosed chamber.

FIG. 5A illustrates the particle mixture 135 disposed within an inner cup 120 of the canister 118 (FIG. 4) in an enclosed chamber 128. The hydrocarbon substance may be introduced into the enclosed chamber 128 through an inlet 139, as illustrated by the directional arrow in FIG. 5A. The pressure of the hydrocarbon substance within the enclosed chamber 128 may be selectively controlled (e.g., increased) to selectively control the amount of the hydrocarbon substance to be encapsulated within the canister 118 (FIG. 4). For example, the pressure of the hydrocarbon substance within the enclosed chamber 128 may be at least about 10 kPa, at least about 100 kPa, at least about 1000 kPa (1.0 MPa), at least about 10 MPa, at least about 100 MPa, or even at least about 500 MPa.

Figure 5B:
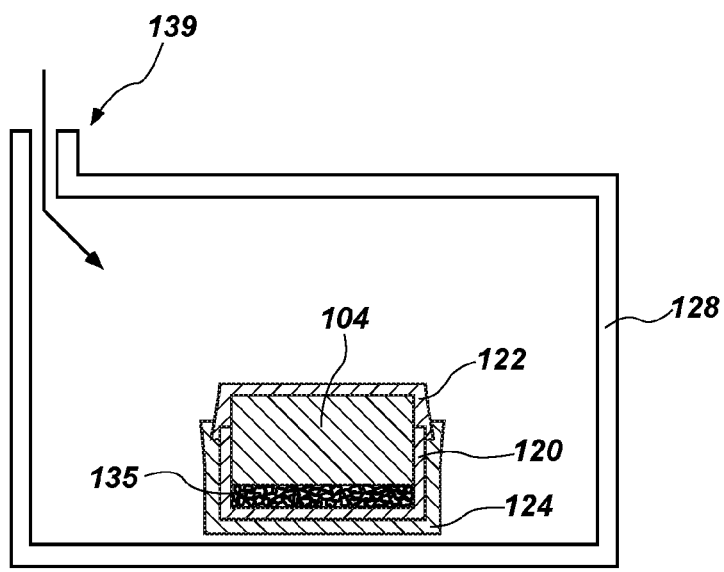

Referring to FIG. 5B, the canister 118 may be assembled within the enclosed chamber 128 to encapsulate the particle mixture 135 and the hydrocarbon substance present in the gaseous environment in the enclosed chamber 128 within the canister 118. The sealed canister 118 then may be subjected to HPHT processing.

In some embodiments, the hydrocarbon substance can be introduced into the canister 118 to be subjected to the HPHT processing after placing the particle mixture 135 in the canister 118. In other embodiments, the hydrocarbon substance may be introduced to the particle mixture 135 in a separate container prior to inserting the particle mixture 135 into the canister 118 to be subjected to HPHT processing. In such embodiments, the particle mixture 135 may remain in a hydrocarbon environment until it is sealed in the canister 118 to be subjected to HPHT processing.

In additional embodiments of the disclosure, the hydrocarbon substance may be mixed with the particle mixture 135 and sealed in the canister 118 to be subjected to HPHT processing while the hydrocarbon substance is in a solid or liquid state. For example, the hydrocarbon substance may be a compressed liquid or solid or a complex of a hydrocarbon with another material. In some embodiments, the hydrocarbon substance may include a hydrated hydrocarbon, such as methane hydrate (i.e., methane clathrate), ethane hydrate, etc. Methane hydrate, other hydrocarbon hydrates, or other forms of hydrocarbon mixtures that may be in a liquid or solid form may be introduced with the particle mixture 135. Introducing the hydrocarbon substance may optionally be performed at temperatures below room temperature (e.g., at cryogenic temperatures). For example, the hydrocarbon substance may be introduced with the particle mixture 135 at temperatures at which the hydrocarbon substance forms a liquid or solid, for example, temperatures of less than −150° C., less than −161° C., or less than −182° C.

Without being bound by any particular theory, it is believed that the functional groups on the functionalized nanoparticles 131 and the optional hydrocarbon substance promote the formation of diamond-to-diamond inter-granular bonds 110 between the diamond grains 106, 108, as shown in FIG. 2. For example, the functional groups and the hydrocarbon substance may dissociate in HPHT conditions. Each carbon atom, after dissociation, may bond with one or more of the diamond particles (e.g., diamond nanoparticles 130 or relatively larger diamond particles 134 (FIG. 3D)). The hydrogen atoms, after dissociation, may form hydrogen gas (H$_2$), which may be a reducing agent. Some hydrogen gas may react with impurities or catalyst material (if present) within the polycrystalline diamond 102. Some hydrogen gas may diffuse out of the polycrystalline diamond 102 and may react with material of the canister 118. Some hydrogen gas may bond to exposed surfaces of the polycrystalline diamond 102 to form hydrogen-terminated polycrystalline diamond.

Figure 6:
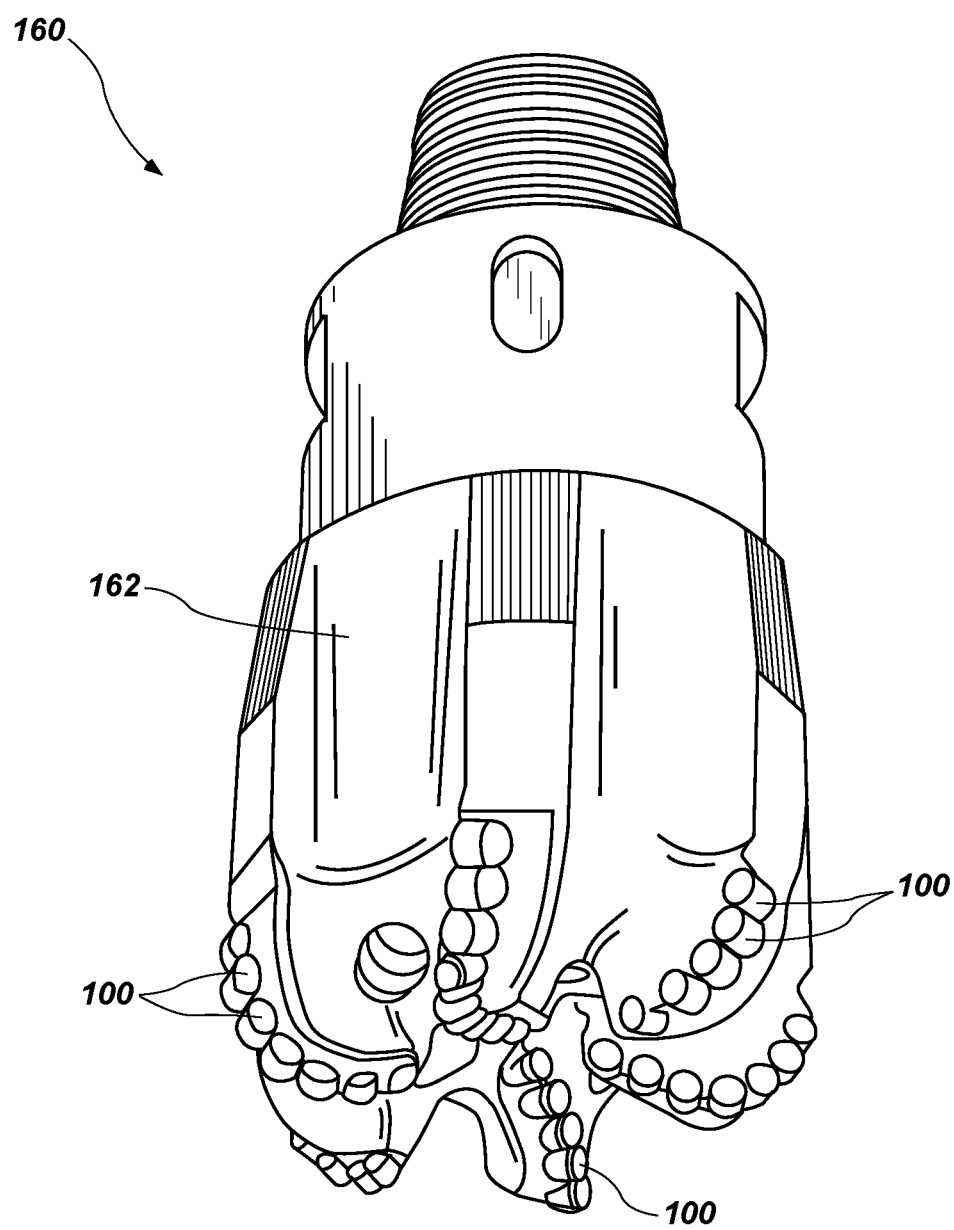
FIG. 6 illustrates an earth-boring rotary drill bit comprising polycrystalline diamond cutting elements as described herein.

Embodiments of cutting elements 100 (FIG. 1) that include polycrystalline diamond 102 fabricated as described herein may be mounted to earth-boring tools and used to remove subterranean formation material in accordance with additional embodiments of the present disclosure. FIG. 6 illustrates a fixed-cutter earth-boring rotary drill bit 160. The drill bit 160 includes a bit body 162. A plurality of cutting elements 100 as described herein may be mounted on the bit body 162 of the drill bit 160. The cutting elements 100 may be brazed or otherwise secured within pockets formed in the outer surface of the bit body 162. Other types of earth-boring tools, such as roller cone bits, percussion bits, hybrid bits, reamers, etc., also may include cutting elements 100 as described herein.

Polycrystalline diamond 102 (FIGS. 1 and 2) fabricated using methods as described herein may exhibit improved abrasion resistance and thermal stability.

Additional non-limiting example embodiments of the disclosure are described below.

Embodiment 1: A method of fabricating polycrystalline diamond, comprising functionalizing surfaces of carbon-free nanoparticles with one or more functional groups, combining the functionalized nanoparticles with diamond nanoparticles and diamond grit to form a particle mixture, and subjecting the particle mixture to HPHT conditions to form inter-granular bonds between the diamond nanoparticles and the diamond grit.

Embodiment 2: The method of Embodiment 1, wherein functionalizing the surfaces of the carbon-free nanoparticles with one or more functional groups comprises functionalizing the surfaces of the carbon-free nanoparticles with methyl functional groups.

Embodiment 3: The method of Embodiment 1 or Embodiment 2, wherein functionalizing the surfaces of the carbon-free nanoparticles with one or more functional groups comprises functionalizing the surfaces of the carbon-free nanoparticles with acetylene functional groups.

Embodiment 4: The method of any of Embodiments 1 through 3, further comprising selecting the carbon-free nanoparticles to comprise a metal or a metal alloy.

Embodiment 5: The method of Embodiment 4, further comprising selecting the carbon-free nanoparticles to comprise one or more of iron, cobalt, and nickel.

Embodiment 6: The method of any of Embodiments 1 through 3, further comprising selecting the carbon-free nanoparticles to comprise a ceramic material.

Embodiment 7: The method of Embodiment 6, further comprising selecting the carbon-free nanoparticles to comprise one or more of an oxide and a nitride.

Embodiment 8: The method of Embodiment 6 or Embodiment 7, further comprising selecting the carbon-free nanoparticles to comprise alumina or magnesia.

Embodiment 9: The method of any of Embodiments 1 through 8, wherein combining the functionalized nanoparticles with the diamond nanoparticles and the diamond grit to form the particle mixture comprises suspending the functionalized nanoparticles and the diamond nanoparticles in a liquid to form a suspension and drying the suspension.

Embodiment 10: The method of Embodiment 9, wherein drying the suspension comprises one or more of spray drying, freeze drying, and flash drying the suspension.

Embodiment 11: The method of Embodiment 9 or Embodiment 10, further comprising suspending the diamond grit in the liquid.

Embodiment 12: The method of any of Embodiments 9 through 11, wherein drying the suspension comprises drying the suspension to form a powder product.

Embodiment 13: The method of Embodiment 12, further comprising mixing the powder product with the diamond grit to form the particle mixture.

Embodiment 14: The method of Embodiment 13, further comprising milling the particle mixture prior to subjecting the particle mixture to the HPHT conditions.

Embodiment 15: The method of Embodiment 12, further comprising milling the powder product.

Embodiment 16: The method of any of Embodiments 1 through 15, wherein subjecting the particle mixture to the HPHT conditions comprises subjecting the particle mixture to a temperature of at least about 1400° C. and a pressure of at least about 5.0 GPa.

Embodiment 17: A cutting element for use in an earth-boring tool, the cutting element comprising a polycrystalline diamond material formed by a method comprising functionalizing surfaces of carbon-free nanoparticles with one or more functional groups, combining the functionalized nanoparticles with diamond nanoparticles and diamond grit to form a particle mixture, and subjecting the particle mixture to HPHT conditions to form inter-granular bonds between the diamond nanoparticles and the diamond grit.

Embodiment 18: The cutting element of Embodiment 17, wherein functionalizing the surfaces of the carbon-free nanoparticles with one or more functional groups comprises functionalizing the surfaces of the carbon-free nanoparticles with methyl or acetylene functional groups.

Embodiment 19: An earth-boring tool comprising a cutting element, the cutting element comprising a polycrystalline diamond material formed by a method comprising functionalizing surfaces of carbon-free nanoparticles with one or more functional groups, combining the functionalized nanoparticles with diamond nanoparticles and diamond grit to form a particle mixture, and subjecting the particle mixture to HPHT conditions to form inter-granular bonds between the diamond nanoparticles and the diamond grit.

Embodiment 20: The earth-boring tool of Embodiment 19, further comprising selecting the carbon-free nanoparticles to comprise a ceramic, a metal, or a metal alloy.

Embodiment 21: The earth-boring tool of Embodiment 19 or Embodiment 20, wherein the earth-boring tool comprises an earth-boring rotary drill bit.

While the present invention has been described herein with respect to certain embodiments, those of ordinary skill in the art will recognize and appreciate that it is not so limited. Rather, many additions, deletions, and modifications to the embodiments depicted and described herein may be made without departing from the scope of the invention as hereinafter claimed, and legal equivalents. In addition, features from one embodiment may be combined with features of another embodiment while still being encompassed within the scope of the invention as contemplated by the inventor. Further, the invention has utility in drill bits having different bit profiles as well as different cutter types.

What is claimed is:

1. A method of fabricating polycrystalline diamond, comprising:
subjecting a particle mixture to high pressure and high temperature (HPHT) conditions to form inter-granular diamond-to-diamond bonds, wherein the particle mixture comprises, before subjecting to the HPHT conditions:
a plurality of non-diamond nanoparticles, each comprising a carbon-free core and at least one functional group attached thereto;
diamond nanoparticles; and
diamond grit.

2. The method of claim 1, further comprising functionalizing at least some of the plurality of non-diamond nanoparticles with functional groups formulated to form diamond.

3. The method of claim 1, further comprising functionalizing at least some of the plurality of non-diamond nanoparticles with functional groups comprising carbon and hydrogen.

4. The method of claim 1, wherein subjecting a particle mixture to HPHT conditions comprises at least partially decomposing the at least one functional group.

5. The method of claim 4, wherein at least partially decomposing the at least one functional group comprises forming elemental carbon and elemental hydrogen.

6. The method of claim 1, further comprising exposing the carbon-free cores to a methane gas environment before subjecting the particle mixture to HPHT conditions.

7. The method of claim 6, wherein exposing the carbon-free cores to a methane gas environment comprises forming carbon-based functional groups on the carbon-free cores by chemical vapor deposition (CVD).

8. The method of claim 1, further comprising encapsulating at least some of the carbon-free cores in a polymer before subjecting the particle mixture to HPHT conditions.

9. The method of claim 1, further comprising forming the plurality of non-diamond nanoparticles to have a combination of at least two different functional groups.

10. The method of claim 1, wherein the at least one functional group comprises carbon atoms and hydrogen atoms, and wherein a ratio of the carbon atoms to the hydrogen atoms is within a range from about 1:1 to about 1:3.

11. The method of claim 1, further comprising forming agglomerates comprising the plurality of non-diamond nanoparticles and the diamond nanoparticles.

12. The method of claim 11, further comprising mixing the agglomerates with the diamond grit.

13. The method of claim 1, further comprising encapsulating the particle mixture and a hydrocarbon substance in a canister before subjecting the particle mixture to HPHT conditions.

14. A cutting element for use in an earth-boring tool, the cutting element comprising a polycrystalline diamond material formed by a method comprising:
subjecting a particle mixture to high pressure and high temperature (HPHT) conditions to form inter-granular diamond-to-diamond bonds, wherein the particle mixture comprises, before subjecting to the HPHT conditions:
a plurality of non-diamond nanoparticles, each comprising a carbon-free core and at least one functional group attached thereto;
diamond nanoparticles; and
diamond grit.

15. The cutting element of claim 14, further comprising a substrate, wherein the polycrystalline diamond material is bonded to the substrate.

16. The cutting element of claim 15, wherein the substrate comprises a generally cylindrical body of cobalt-cemented tungsten carbide.

17. The cutting element of claim 14, wherein the cutting element comprises a network of diamond grains having a bimodal size distribution.

18. The cutting element of claim 17, wherein the network of diamond grains comprises a first plurality of grains and a second plurality of grains, the first plurality of grains having an average particle dimension from about 1 µm to about 500 µm, and the second plurality of grains having an average particle dimension of about 500 nm or less.

19. An earth-boring tool comprising a cutting element, the cutting element comprising a polycrystalline diamond material formed by a method comprising:
subjecting a particle mixture to high pressure and high temperature (HPHT) conditions to form inter-granular diamond-to-diamond bonds, wherein the particle mixture comprises, before subjecting to the HPHT conditions:
a plurality of non-diamond nanoparticles, each comprising a carbon-free core and at least one functional group attached thereto;
diamond nanoparticles; and
diamond grit.

20. The earth-boring tool of claim 19, wherein the polycrystalline diamond comprises a generally cylindrical body bonded to a substrate comprising cobalt-cemented tungsten carbide.

* * * * *